| (12) | United States Patent | (10) Patent No.: | US 10,412,496 B2 |
|---|---|---|---|
| | Suyama et al. | (45) Date of Patent: | Sep. 10, 2019 |

(54) SOUND EQUIPMENT, LOCK RELEASE METHOD, AND MEDIUM

(71) Applicant: YAMAHA CORPORATION, Hamamatsu-shi (JP)

(72) Inventors: Akio Suyama, Hamamatsu (JP); Daisuke Takahashi, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 16/124,925

(22) Filed: Sep. 7, 2018

(65) Prior Publication Data

US 2019/0007773 A1 Jan. 3, 2019

Related U.S. Application Data

(63) Continuation of application No. PCT/JP2017/010067, filed on Mar. 14, 2017.

(30) Foreign Application Priority Data

Mar. 17, 2016 (JP) .................................. 2016-053458
Mar. 17, 2016 (JP) .................................. 2016-053459

(51) Int. Cl.
*H04R 5/04* (2006.01)
*G06F 3/0484* (2013.01)
(Continued)

(52) U.S. Cl.
CPC ............ *H04R 5/04* (2013.01); *G06F 3/04847* (2013.01); *G06F 21/31* (2013.01); *H03G 3/04* (2013.01);
(Continued)

(58) Field of Classification Search
CPC .. H04R 5/04; H04R 3/00; H04N 5/445; G06F 3/0484; G06F 21/31; H03G 1/00
(Continued)

(56) References Cited

U.S. PATENT DOCUMENTS 8,005,243 B2 8/2011 Terada et al.
8,170,240 B2 5/2012 Suzuki
(Continued)

FOREIGN PATENT DOCUMENTS

JP 2001078300 A 3/2001
JP 2004252016 A 9/2004
(Continued)

OTHER PUBLICATIONS

International Search Report issued in Intl. Appln. No. PCT/JP2017/010067 dated Jun. 6, 2017. English translation provided.
Written Opinion issued in Intl. Appln. No. PCT/JP2017/010067 dated Jun. 6, 2017.
"Power Amplifier TX6n/TX5n/TX4n, Reference Manual." 2009:60. Yamaha Corporation. Japan.

*Primary Examiner* — Melur Ramakrishnaiah

(74) *Attorney, Agent, or Firm* — Rossi, Kimms & McDowell LLP

(57) ABSTRACT

Sound equipment includes an operation element, a memory, a processor, a controller, and a display. The operation element receives a set value. The memory stores the set value. The processor performs processing by the set value of the memory. The controller executes a normal state in which the set value of the memory is updated by the set value of the operation element, and a locked state in which the set value of the memory is fixed regardless of the set value of the operation element, and, by either a first method when the set values are equal or a second method by updating the set value of the memory with the set value of the operation element, releases the locked state and shifts the locked state to the normal state. The display displays a selection screen that receives a selection of the first method or the second method.

11 Claims, 18 Drawing Sheets

(51) Int. Cl.
  *G06F 21/31*  (2013.01)
  *H04N 5/445*  (2011.01)
  *H04R 3/00*  (2006.01)
  *H04R 29/00*  (2006.01)
  *H03G 3/04*  (2006.01)

(52) U.S. Cl.
  CPC ......... *H04N 5/44504* (2013.01); *H04R 3/007* (2013.01); *H04R 29/008* (2013.01); *H04R 2430/01* (2013.01)

(58) Field of Classification Search
  USPC ........ 381/55, 77, 119; 715/727, 771; 700/94
  See application file for complete search history.

(56) References Cited

U.S. PATENT DOCUMENTS

| | | | |
|---|---|---|---|
| 8,917,888 B2 | 12/2014 | Nakamura | |
| 2006/0215857 A1* | 9/2006 | Hirano | H04H 60/04 381/119 |
| 2010/0179674 A1* | 7/2010 | Willard | G10H 1/0025 700/94 |

FOREIGN PATENT DOCUMENTS

| | | | |
|---|---|---|---|
| JP | 2010232855 A | 10/2010 | |
| JP | 2012054857 A | 3/2012 | |
| JP | 2013150267 A | 8/2013 | |
| WO | 2008117337 A1 | 10/2008 | |

* cited by examiner

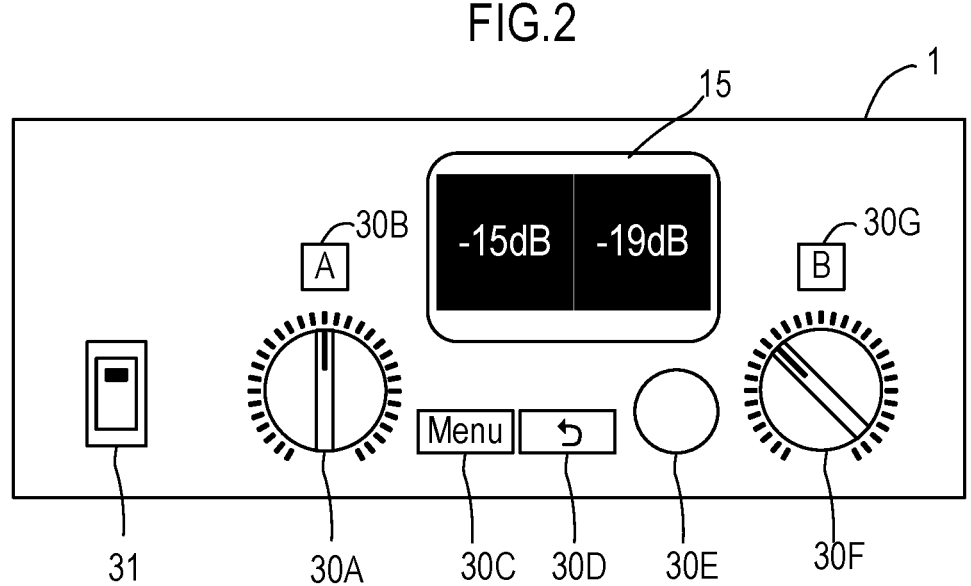

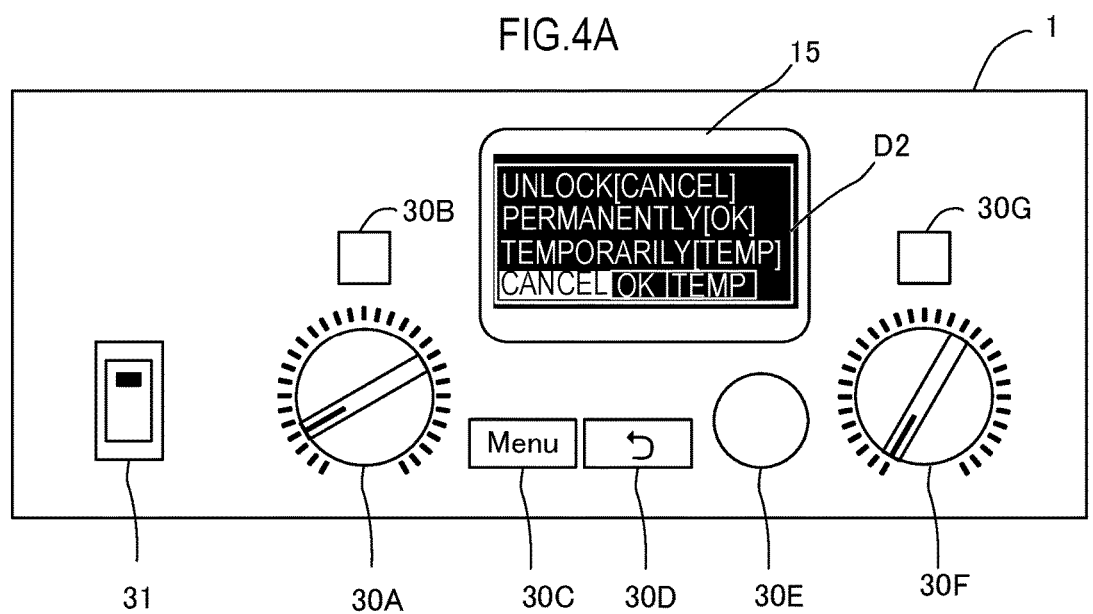

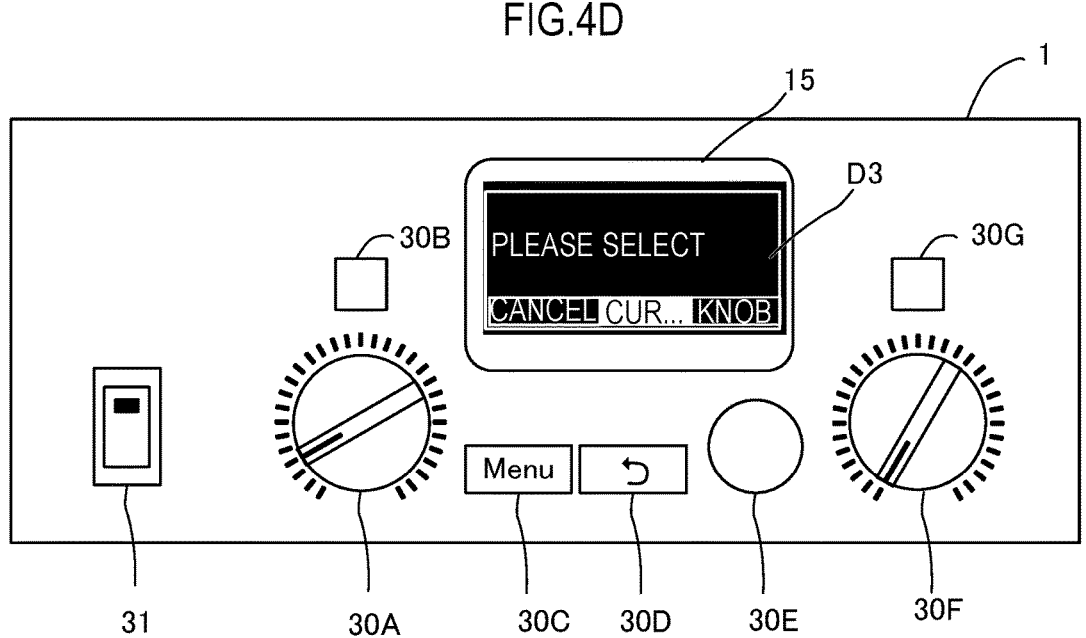

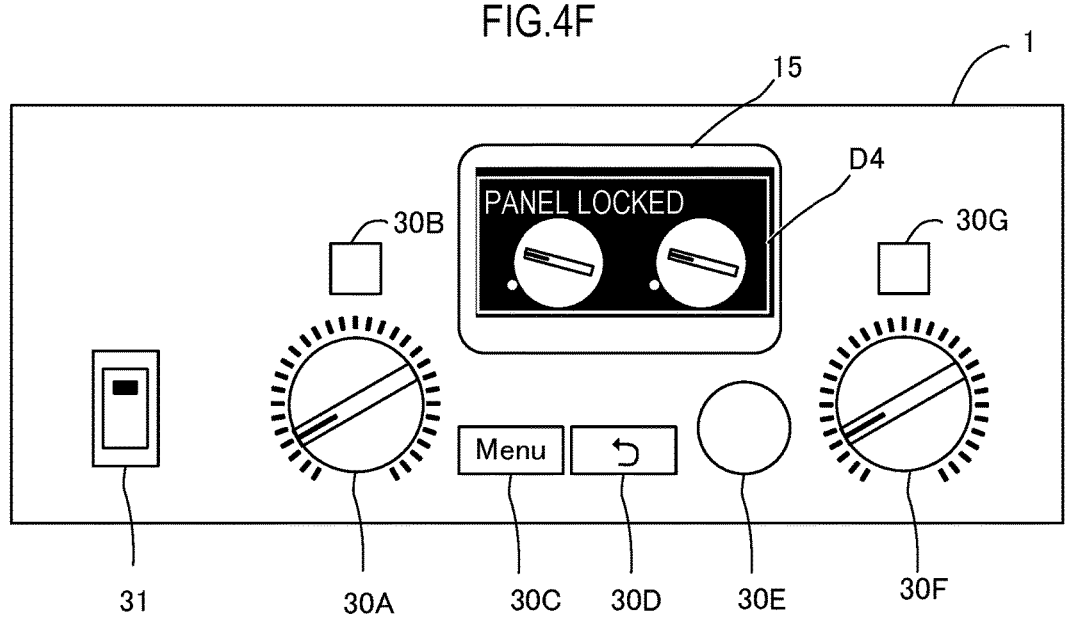

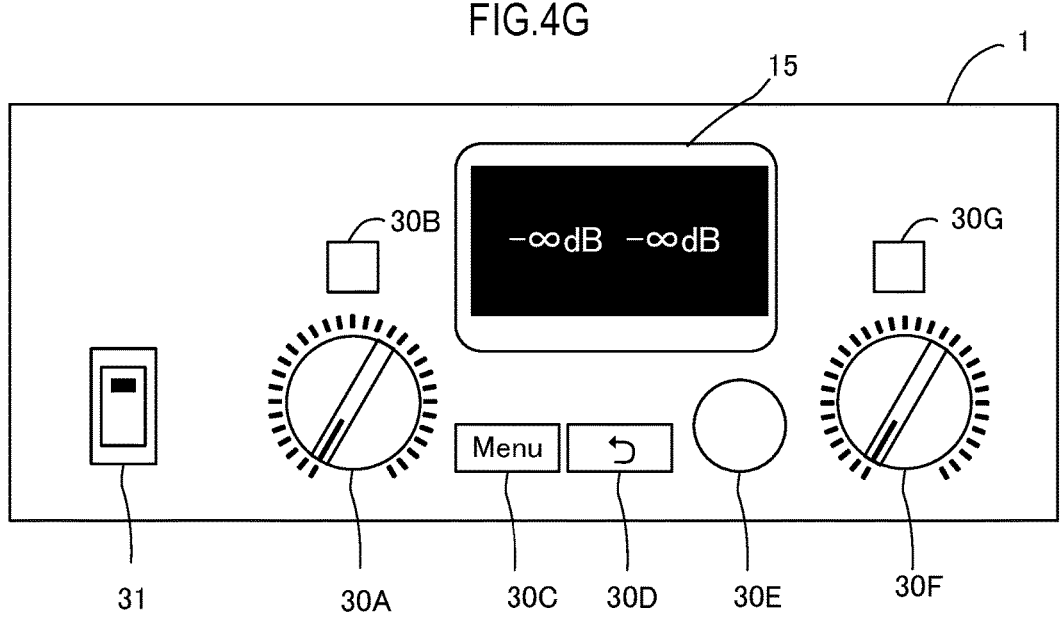

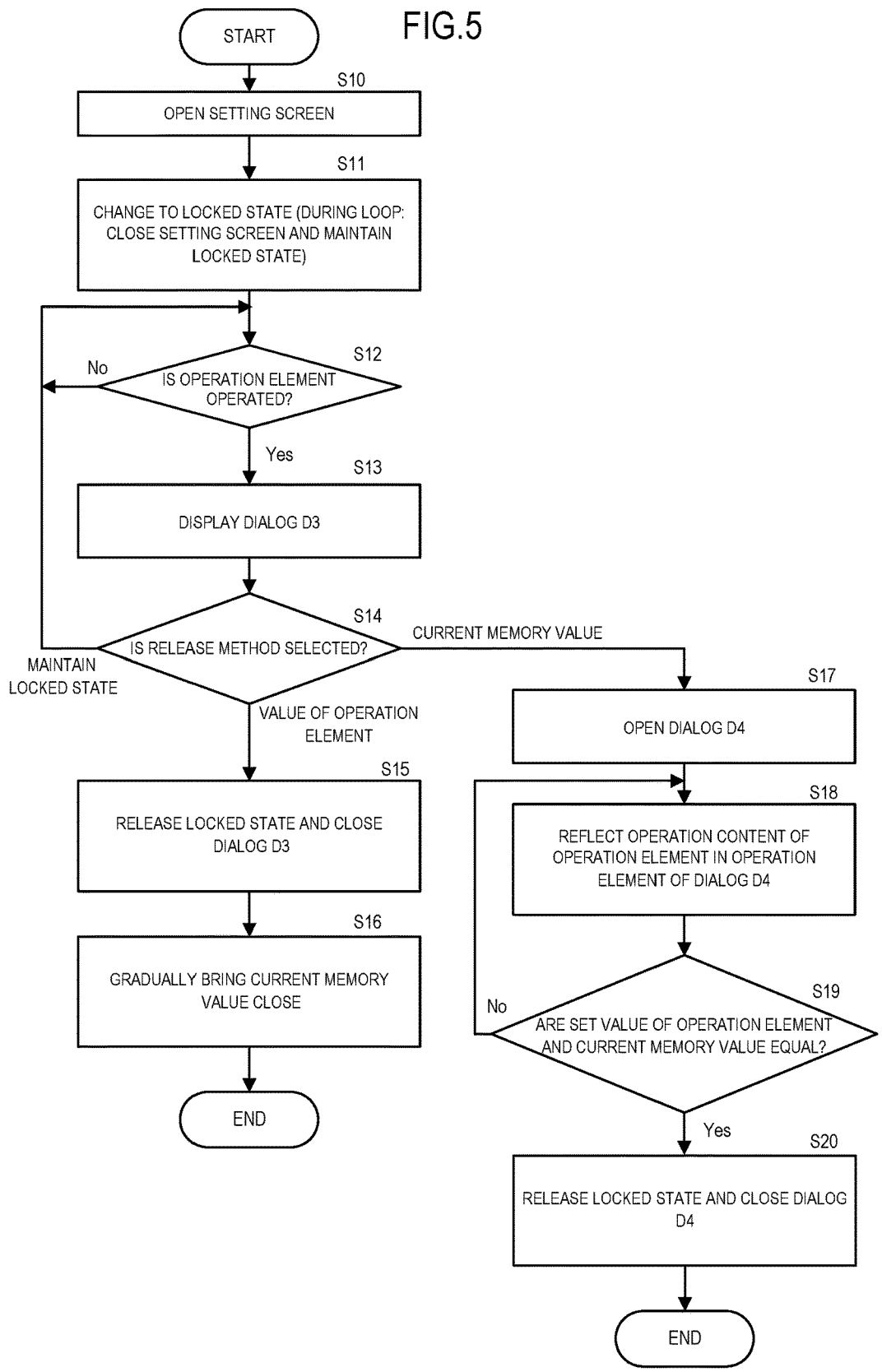

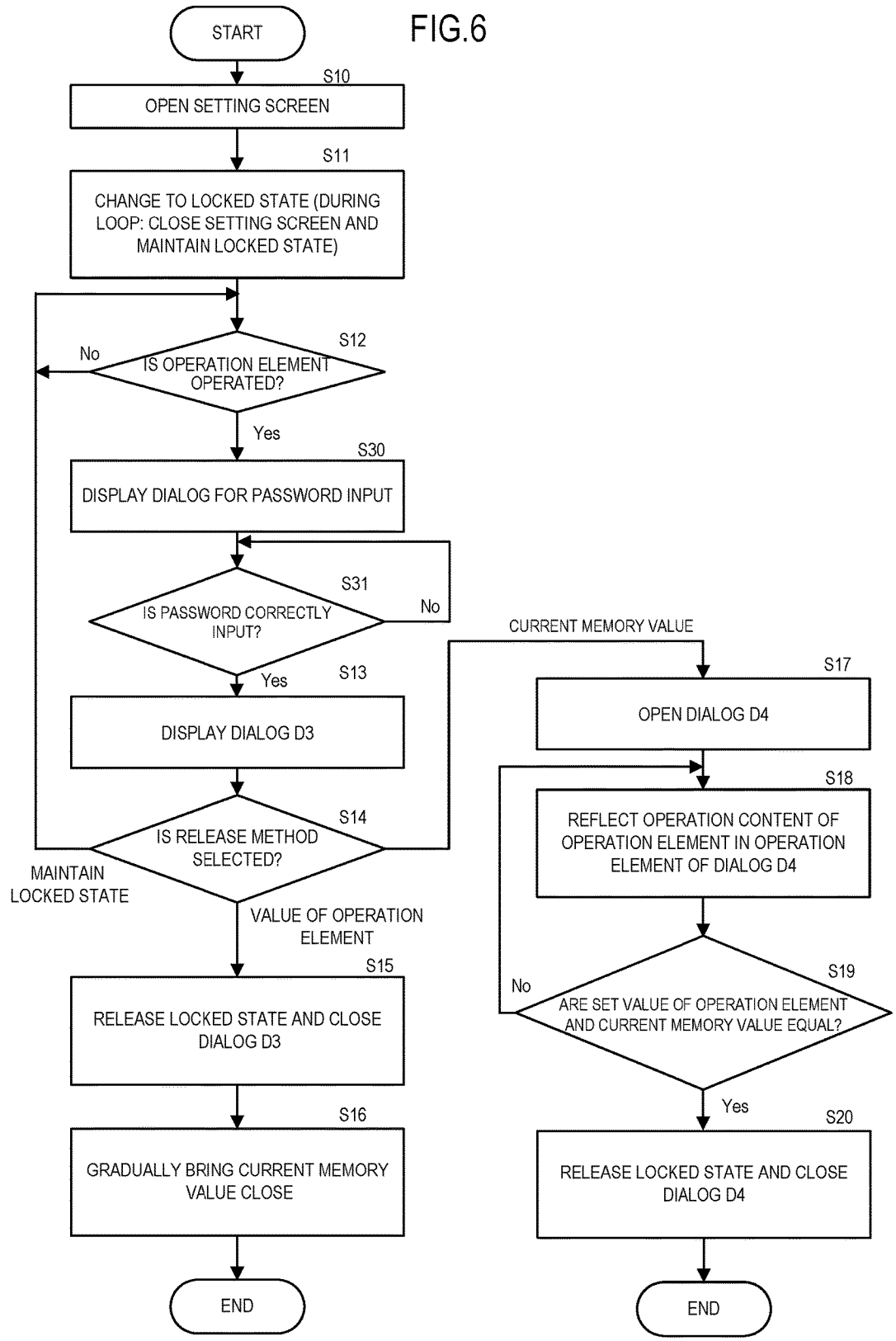

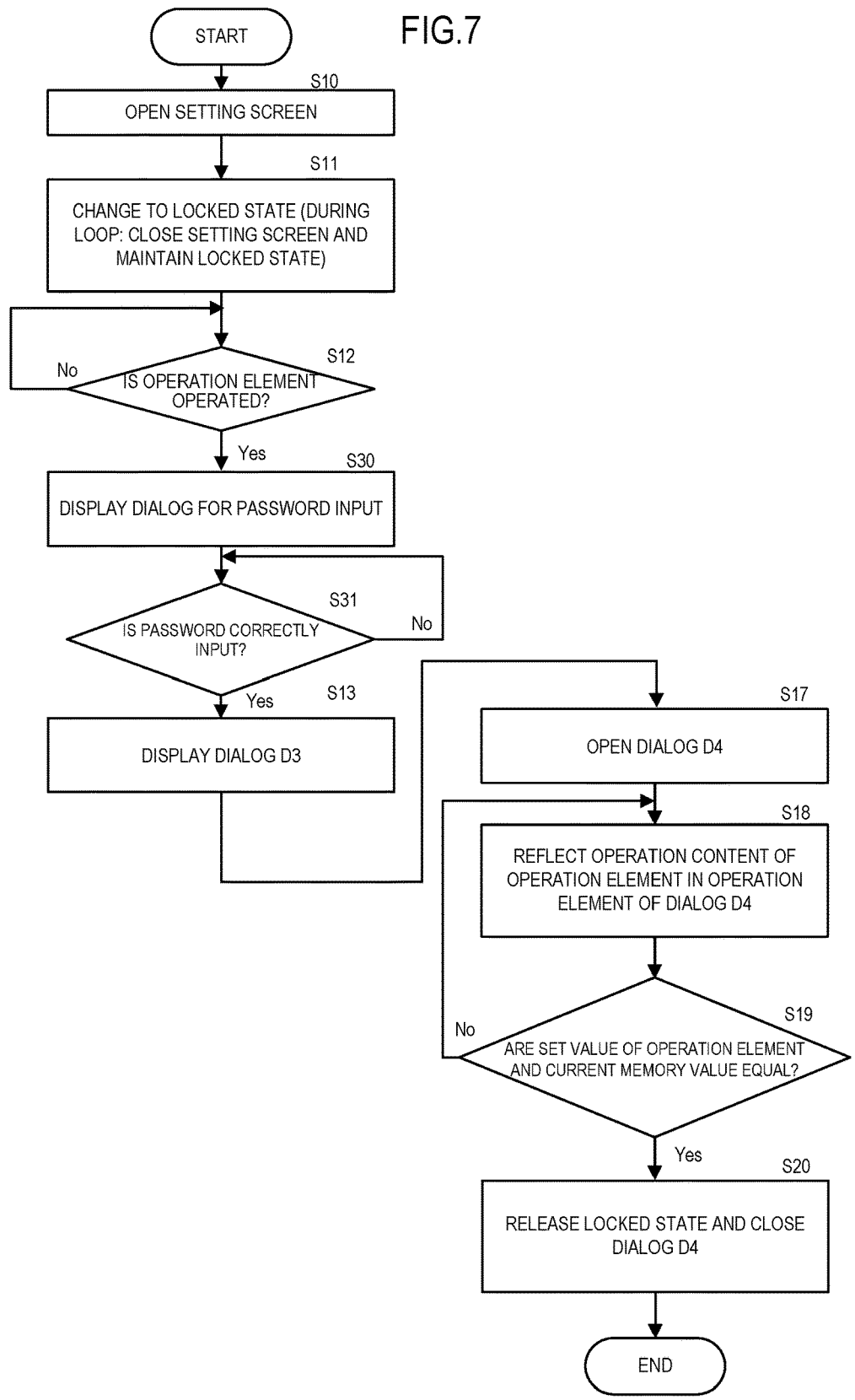

SOUND EQUIPMENT, LOCK RELEASE METHOD, AND MEDIUM

CROSS REFERENCE TO RELATED APPLICATIONS

The present application is a continuation application of International Patent Application No. PCT/JP2017/010067, filed on Mar. 14, 2017, which claims priority to Japanese Patent Application No. 2016-053458, filed on Mar. 17, 2016 and Japanese Patent Application No. 2016-053459, filed on Mar. 17, 2016. The contents of these applications are incorporated herein by reference in their entirety.

BACKGROUND OF THE INVENTION

1. Field of the Invention

A preferred embodiment of the present invention relates to sound equipment, a lock release method, and a medium.

2. Description of the Related Art

A conventional power amplifier includes a plurality of operation elements including an operation element of an attenuator, and a panel. The panel arranges the plurality of operation elements. The power amplifier makes settings suitable for an installation location and the use environment at the time of installation.

After the settings are made, when persons other than a person in charge operate the operation element of the panel, the suitable settings may be changed, which may cause trouble.

In order to avoid such trouble, the conventional power amplifier includes a cover that covers the front of a panel so that any persons other than a person in charge cannot operate an operation element. In addition, a conventional digital power amplifier has a panel lock function that executes a locked state in which an operation of a panel is not reflected in the settings even when the panel is operated.

The plurality of operation elements include an operation element for adjusting a sound volume level. The digital power amplifier changes the sound volume level according to the position of the operation element. The digital power amplifier, in the locked state, does not change the sound volume level even when the position of the operation element is changed. The digital power amplifier changes volume according to the position of the operation element when the locked state is released and the position of the operation element has been changed.

In some cases, a user may desire to release a locked state after returning the position of an operation element to the original position, depending on a use condition.

SUMMARY OF THE INVENTION

In view of the foregoing, a preferred embodiment according to the present invention is directed to provide sound equipment, a lock release method, and a medium that allow a user to release a locked state, depending on a use condition, or that allow a user to easily recognize that the position of an operation element is changed.

Sound equipment according to a preferred embodiment of the present invention includes an operation element, a memory, a processor, a controller, and a display. The operation element receives a set value. The memory stores the set value. The processor performs processing according to the set value stored in the memory. The controller executes a normal state in which the set value stored in the memory is updated according to the set value received by the operation element, and a locked state in which the set value of the memory is fixed regardless of the set value received by the operation element, and, by either a first method of releasing the locked state in a case in which the set value of the memory and the set value received by the operation element are equal or a second method of releasing the locked state by updating the set value stored in the memory with the set value received by the operation element, releases the locked state and shifts the locked state to the normal state. The display displays a selection screen that receives a selection of the first method or the second method.

In addition, sound equipment according to another preferred embodiment of the present invention includes an operation element, a memory, a processor, a controller, and a display. The operation element receives a set value. The memory stores the set value. The processor performs processing according to the set value stored in the memory. The controller executes a normal state in which the set value stored in the memory is updated according to the set value received by the operation element, and a locked state in which the set value of the memory is fixed regardless of the set value received by the operation element. The display displays a display screen that, when the locked state is released and shifted to the normal state, in a case in which the set value of the memory and the set value received by the operation element have a difference, indicates that the difference is present.

According to a preferred embodiment of the present invention, a user can release a locked state, depending on a use condition. Alternatively, according to another preferred embodiment, the user can easily recognize that the position of an operation element has been changed.

The above and other elements, features, characteristics, and advantages of the present invention will become more apparent from the following detailed description of the preferred embodiments with reference to the attached drawings.

BRIEF DESCRIPTION OF THE DRAWINGS

FIG. 2 is a view of a configuration of an operation panel of the power amplifier.
FIG. 4A is a view of a dialog D2.
FIG. 4D is a view of the dialog D3.
FIG. 4F is a view of the dialog D4.
FIG. 4G is a view of the home screen.
FIG. 5 is a flow chart of panel lock processing.
FIG. 6 is a flow chart of other panel lock processing.
FIG. 7 is a flow chart of further other panel lock processing.

DETAILED DESCRIPTION OF THE PREFERRED EMBODIMENTS

Figure 1:
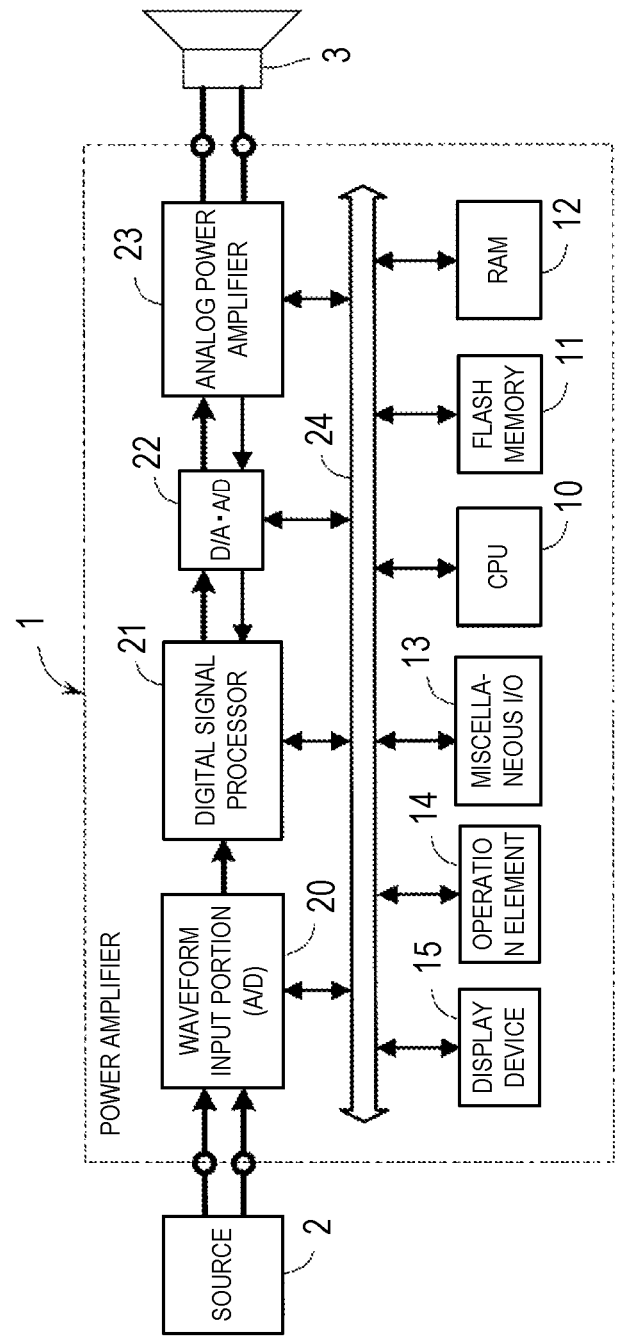
FIG. 1 is a functional block diagram showing a configuration of a power amplifier.

FIG. 1 is a functional block diagram showing a configuration of a power amplifier 1. The power amplifier 1 has two channels of an Ach and a Bch. The power amplifier 1 includes components such as a CPU (Central Processing Unit) 10, a flash memory 11, a RAM (Random Access Memory) 12, a miscellaneous I/O 13, an operation element 14, a display device 15, a waveform input portion 20, a digital signal processor 21, a D/A and A/D portion 22, and an analog power amplifier 23. The components are connected to each other through a bus 24. The digital signal processor 21 is configured by a DSP (Digital Signal Processor).

The CPU 10 is a controller that performs integrated control on the operation of the power amplifier 1. The CPU 10, by executing a control program stored in the flash memory 11 being a medium, performs processing such as editing of a parameter according to operation of the operation element 14, control of display in the display device 15, or control of a locked state and lock release state of a panel lock.

The flash memory 11 is a rewritable nonvolatile storage medium that stores a control program to be executed by the CPU 10, configuration data, an SP preset (preset for a speaker) corresponding to a speaker, and the like. It is to be noted that the configuration data defines a path of an audio signal from an input portion to an output portion, and signal processing in the path.

The RAM 12 is a volatile storage portion in which the CPU 10 writes and reads various types of data. The RAM 12 is a work memory of the CPU 10, or a current memory that stores a current memory value being a set value that is set to the digital signal processor 21 at present.

The miscellaneous I/O 13 is an interface to connect various types of external equipment and perform communication. As the standards used for communication in the miscellaneous I/O 13, any desired standards such as Ethernet (registered trademark) or a USB (Universal Serial Bus) are able to be used. The mode of connection may be wired or may be wireless.

The display device 15 is a display portion that displays various types of information according to the control of the CPU 10. The display device 15 may be a liquid crystal display (LCD) panel or a light emitting diode (LED), for example.

Subsequently, a description will be made of a configuration of the path from the input portion to the output portion of an audio signal. The waveform input portion 20 receives analog audio signals of an Ach and a Bch from an external source 2. The waveform input portion 20 converts each of the analog audio signal of the Ach and the analog audio signal of the Bch into a digital audio signal, and supplies the digital audio signals to the digital signal processor 21.

The digital signal processor 21 performs signal processing such as crossover processing, delay processing, equalizer processing, limiter processing, or dynamics processing, on the audio signal of the Ach and the audio signal of the Bch. The digital signal processor 21 outputs the processed audio signal of the Ach and the processed audio signal of the Bch to the D/A and A/D portion 22.

The D/A and A/D portion 22 converts the digital audio signal of the Ach and the digital audio signal of the Bch into an analog audio signal of the Ach and an analog audio signal of the Bch, and supplies the analog audio signals to the analog power amplifier 23.

The analog power amplifier 23 amplifies the analog audio signal of the Ach and the analog audio signal of the Bch, and outputs the amplified audio signal of the Ach and the amplified audio signal of the Bch to an external speaker 3 through a speaker terminal.

FIG. 2 is a view of a configuration of an operation panel of the power amplifier 1. As shown in FIG. 2, an operation panel includes a rectangular-shaped display device 15 disposed on the upper side at approximately the center of the operation panel. In addition, the operation panel includes a power switch 31 disposed in the lower portion on the left side. The operation panel includes an Ach level knob 30A that controls the output level of the audio signal of the Ach and an Ach selection button 30B indicated as "A" that are disposed vertically, on the right side of the power switch 31. The operation panel includes a menu key (Menu) 30C and a return key 30D that are disposed side by side, on the right side of the Ach level knob 30A.

Further, the operation panel includes a rotary encoder (hereinafter referred to as an "encoder") 30E with a push switch on the right side of the return key 30D. The push switch has a function as an enter key.

The operation panel includes a Bch level knob 30F that controls the output level of the audio signal of the Bch and a Bch selection button 30G indicated as "B" that are disposed vertically, on the right side of the encoder 30E. In addition, the operation panel may include a power indicator (POWER) (not shown) and an alert indicator (ALERT) (not shown) on the upper side of the power switch 31. In addition, the operation panel may include a protection lamp PL-A (not shown) of the Ach and a protection lamp PL-B (not shown) of the Bch, respectively, on the upper side of the Ach selection button 30B and the Bch selection button 30G. The power amplifier 1 includes a protection circuit (not shown). The CPU 10, when detecting an abnormality of the output stage of each channel in the protection circuit, turns on a corresponding protection lamp of either the protection lamp PL-A or the protection lamp PL-B.

It is to be noted that, when a user operates the Ach level knob 30A or the Bch level knob 30F, the CPU 10 controls the output level of the Ach or the Bch according to an operation amount. The display device 15 of FIG. 2 displays a home screen being a basic screen. The display device 15 displays a current output level (−15 dB at the Ach and −19 dB at the Bch) of each of the Ach and the Bch on the home screen.

Figure 3A:
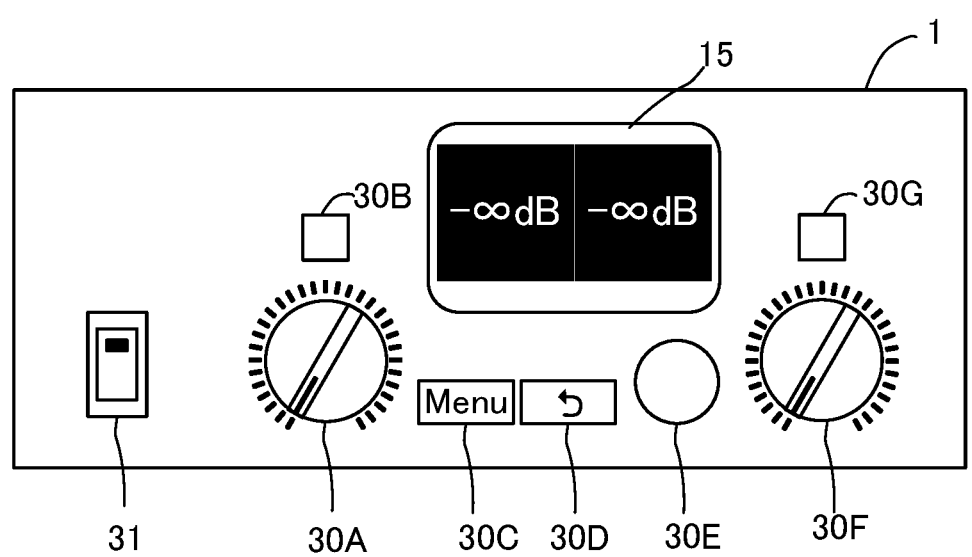
FIG. 3A is a view of a home screen.
Figure 3B:
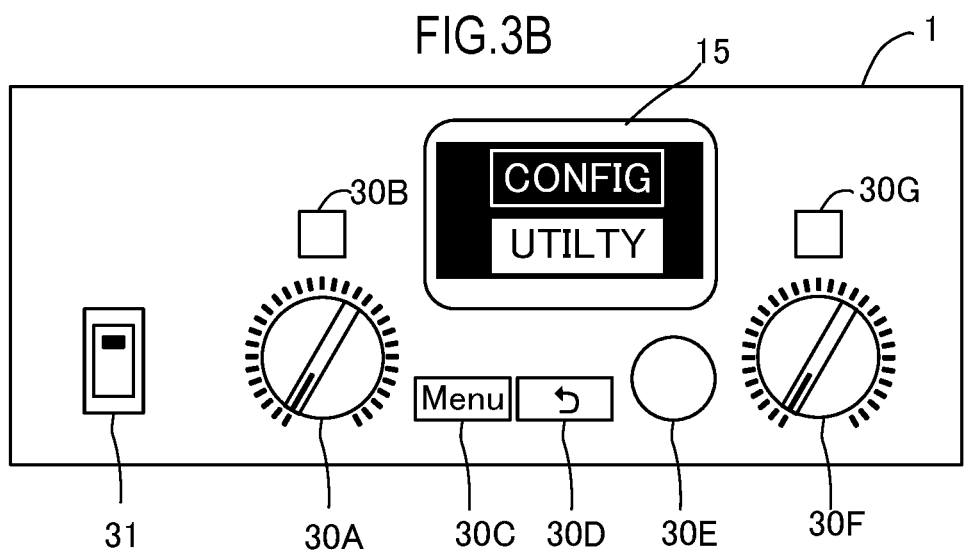
FIG. 3B is a view of a menu screen.

Subsequently, a description will be made of a procedure of setting a locked state of the power amplifier 1 and releasing the locked state. In order to set a locked state and a lock release state of the panel lock, a user, as shown in FIG. 3A, first presses the menu key (Menu) 30C in a state in which the home screen is being displayed on the display device 15. As a result, the CPU 10 displays a menu screen shown in FIG. 3B on the display device 15. In this menu screen, the user is able to select any one of a plurality of menus that have been prepared. In the preferred embodiment, the user selects [UTILITY] as shown in FIG. 3B. In such a case, the CPU 10 displays the selected [UTILITY] with the black and white reversed. Subsequently, the user pushes the encoder 30E. Accordingly, the selection of [UTILITY] is determined. The CPU 10 displays a UTILITY screen shown in FIG. 3C, on the display device 15.

Figure 3C:
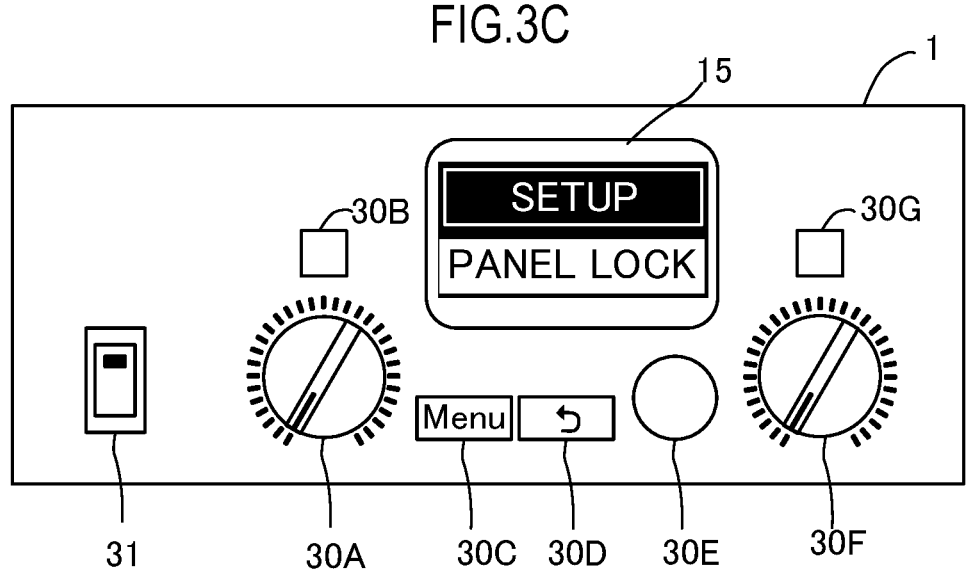
FIG. 3C is a view of a UTILITY screen.

In the UTILITY screen, the user selects any one of a plurality of utilities that have been prepared. When the user selects [PANEL LOCK] as shown in FIG. 3C, the CPU 10 displays [PANEL LOCK] with the black and white reversed. Subsequently, when the user pushes the encoder 30E, the selection of [PANEL LOCK] is determined. As a result, the CPU 10 displays a PANEL LOCK screen shown in FIG. 3D, on the display device 15.

Figure 3D:
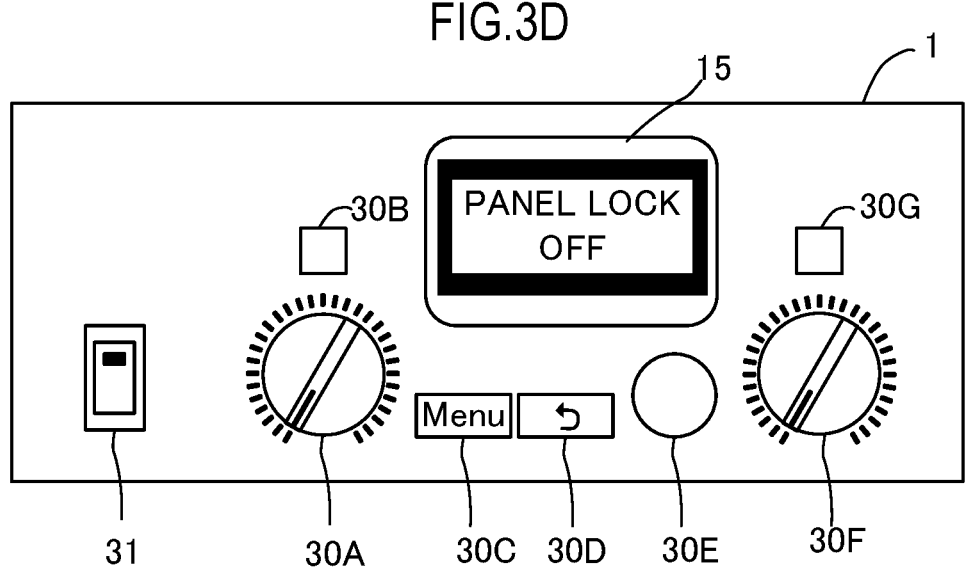
FIG. 3D is a view of a PANEL LOCK screen.

In the PANEL LOCK screen, the CPU 10 displays the characters of [PANEL LOCK OFF] on the display device 15 as shown in FIG. 3D. Then, when the user selects [PANEL LOCK OFF] as shown in FIG. 3D, the CPU 10 displays [PANEL LOCK OFF] with the black and white reversed. Subsequently, when the user pushes the encoder 30E, the CPU 10 displays a window of a dialog D1 shown in FIG. 3E in front of the PANEL LOCK screen displayed on the display device 15.

In the window of the dialog D1, the CPU 10 displays [OFF] for performing lock release, and [ALL] for setting a parameter value displayed on the display device 15 and an operation element provided in the panel to a locked state (however, [OFF] is not shown).

Figure 3E:
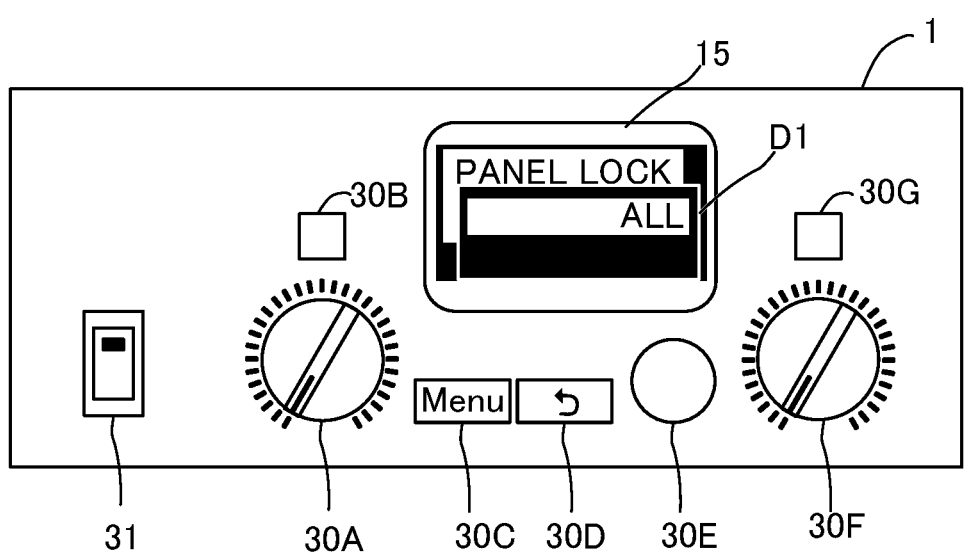
FIG. 3E is a view of a dialog D1.
Figure 3F:
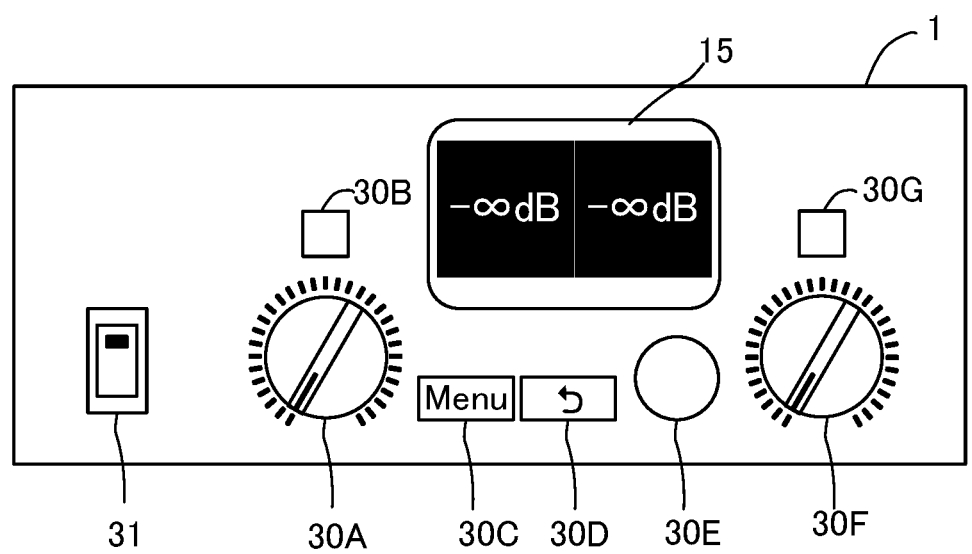
FIG. 3F is a view of the home screen.

The user, in a case of desiring to set the locked state, rotates the encoder 30E and selects [ALL] as shown in FIG. 3E. The CPU 10 displays [ALL] with the black and white reversed. Subsequently, the user pushes the encoder 30E and causes the selection of [ALL] to be determined. As a result, the CPU 10 sets an indicated value of the parameter of the display device 15 of the power amplifier 1 and all operation elements provided in the panel to the locked state, and displays the home screen shown in FIG. 3F on the display device 15.

In the locked state, even when the user operates the operation element of the panel, the value of the parameter assigned to the operation element is not changed, and the indicated value being displayed on the display device 15 is not changed. In other words, in the locked state, the set value according to the position and the operation amount of the operation element is not reflected in the set value of the parameter on the current memory.

Subsequently, a description will be made of a procedure of performing lock release. FIG. 4A to FIG. 4G are views of a portion of the panel of the power amplifier 1.

When a user operates any one of the plurality of operation elements provided in the panel of the power amplifier 1, the CPU 10 opens a window of a dialog D2 shown in FIG. 4A in front of the home screen displayed on the display device 15. In such a case, the user operates the Ach level knob 30A, and performs an operation in which the Ach level knob 30A is rotated to right.

In the window of the dialog D2, the user can select any of maintenance (PERMANENTLY) of a locked state, lock release (UNLOCK), and temporary lock release (TEMPORARILY) by turning the encoder 30E. When the user selects [CANCEL] and pushes the encoder 30E, the selection of lock release (UNLOCK) is determined. The CPU 10 displays a window of a dialog D3 shown in FIG. 4B and FIG. 4D, in front of the home screen displayed on the display device 15. In the window of the dialog D3, the user, when maintaining [CANCEL] the locked state by turning the encoder 30E, can select either [CUR . . . ] being a first method in which operation of an operation element is valid after the value of the operated operation element is returned to a current memory value (a set value of the parameter on the current memory when a locked state is set) in the parameter assigned to the operation element or [KNOB] being a second method in which a current set value of the operation element is reflected in the set value of the parameter assigned to the operation element.

Figure 4B:
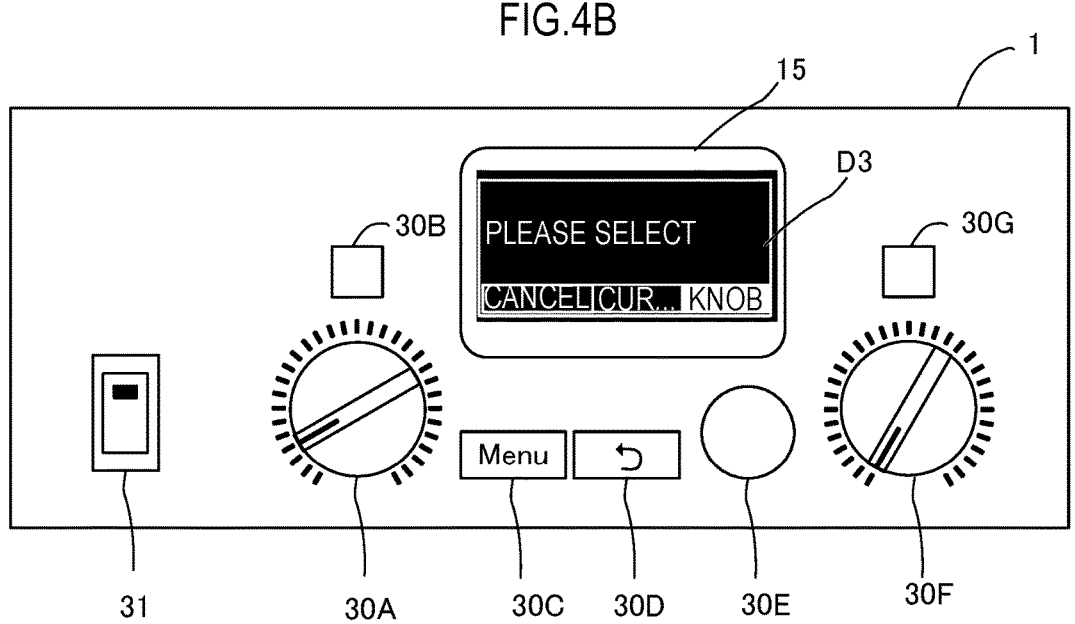
FIG. 4B is a view of a dialog D3.

When the user turns the encoder 30E and selects [KNOB] in the dialog D3, as shown in FIG. 4B, the CPU 10 reverses the black and white of [KNOB]. Subsequently, when the user pushes the encoder 30E, the selection of [KNOB] is determined. The CPU 10, by releasing the locked state and rewriting the set value of the current memory with the current set value of the operation element, updates the current memory value of the parameter assigned to the operation element, and displays the home screen shown in FIG. 4C, on the display device 15.

In such a case, since the position of the Ach level knob 30A has been changed, the set value of the level of the Ach in the current memory is rewritten with the changed set value that the Ach level knob 30A indicates. The digital signal processor 21 performs signal processing with the rewritten set value. It is to be noted that, when the signal processing is performed, the CPU 10 may preferably gradually bring the set value in the current memory close to the current set value of the Ach level knob 30A.

In addition, the CPU 10 updates the display of the current output level of the Ach from −∞ dB to −35 dB (the current set value that the Ach level knob 30A indicates), in the home screen. It is to be noted that, when the lock release is performed, the user can adjust the volume of the Ach or the Bch by performing rotation operation of the Ach level knob 30A or the Bch level knob 30F.

As shown in FIG. 4D, when the user turns the encoder 30E and selects [CUR . . . ] in the dialog D3, the CPU 10 reverses the black and white of [CUR . . . ]. Subsequently, when the user pushes the encoder 30E, the selection of [CUR . . . ] is determined. The CPU 10 displays a dialog D4 in front of the home screen displayed on the display device 15. The CPU 10, in the dialog D4, displays an image obtaining by simulating the operation elements of the Ach level knob 30A and the Bch level knob 30F shown in FIG. 4E. In addition, the CPU 10, in the dialog D4, displays a simulated operation element obtained by simulating the operation position of the operation element.

The CPU 10, in the dialog D4, displays the current memory values of the levels of the Ach and the Bch in the current memory, with a white circle in a vicinity of the simulated operation element. The current memory value is the set value of the Ach level knob 30A and the Bch level knob 30F when the locked state is set.

In this example, since the Ach level knob 30A is operated but the Bch level knob 30F is not operated, the value of the Bch level knob 30F and the current memory value of the level of the Bch are equal. Therefore, the CPU 10 displays [OK] in the vicinity of the simulated operation element of the Bch.

When the user performs the operation of rotating the Bch level knob 30F to right, the CPU 10, as shown in FIG. 4F, rotates the simulated operation element of the Bch to right. In addition, since the value of the Bch level knob 30F is deviated from the current memory value of the level of the Bch, the CPU 10 erases [OK] displayed in the vicinity of the simulated operation element of the Bch.

In addition, when the user performs the rotation operation of the Ach level knob 30A and the Bch level knob 30F and causes the position of the simulated operation element of each of the Ach and the Bch to match the position of a white circle, the CPU 10 determines that the values of the Ach level knob 30A and the Bch level knob 30F are equal to the current memory values of the levels of the Ach and the Bch, and then releases a locked state. The CPU 10 displays the home screen shown in FIG. 4G, on the display device 15. The CPU 10, in the home screen, sets the current output levels of the Ach and the Bch to the same −∞ dB as the output level when the locked state is set. When the lock release is performed, the user can adjust the level of the volume of the Ach or the Bch by performing the rotation operation of the Ach level knob 30A or the Bch level knob 30F.

In the above description, when the Ach level knob 30A is operated, the CPU 10 starts the procedure of lock release of the panel lock. However, for example, the CPU 10 may start the procedure of lock release of the panel lock even when other operation elements other than the Ach level knob 30A and the Bch level knob 30F are operated. In such a case, the set value of the operation element of the Ach level knob 30A and the Bch level knob 30F matches the current memory value on the current memory of the operation element. Therefore, in a case in which the user selects [CUR . . . ] in the dialog D3 as shown in FIG. 4D, the CPU 10 performs lock release without opening the dialog D4, and displays the home screen shown in FIG. 4F. In addition, in a case in which the user selects [KNOB] in the dialog D3 as shown in FIG. 4B, the CPU 10 performs lock release without updating the current memory value on the current memory, and displays the home screen shown in FIG. 4C. Further, the CPU 10 does not update the current output levels of the Ach and the Bch in the home screen.

Subsequently, FIG. 5 is a flow chart of panel lock processing to be executed by the CPU 10. The panel lock processing starts when the selection of [PANEL LOCK] is determined on the UTILITY screen shown in FIG. 3B. The CPU 10, in step S10, displays a PANEL LOCK screen shown in FIG. 3D, on the display device 15. Subsequently, the CPU 10 shifts to the locked state in Step S11 by performing the procedure shown in FIG. 3D and FIG. 3E. The CPU 10 closes a setting screen and displays the home screen shown in FIG. 3F.

Subsequently, the CPU 10 determines whether the operation element has been operated in Step S12. The CPU 10, when determining that the operation element is not operated (No), repeats processing of Step S12. The CPU 10, when determining that the operation element has been operated (Yes), proceeds to Step S13. In Step S13, the CPU 10 opens the window of the dialog D2 shown in FIG. 4A. When the user, in the window of the dialog D2, turns the encoder 30E and selects [OK], and pushes the encoder 30E, the selection of lock release (PERMANENTLY) is determined. The CPU 10 opens the window of the dialog D3 shown in FIG. 4B or FIG. 4D (Step S13).

In Step S14, the user selects any of [CANCEL], [CUR . . . ], or [KNOB] in the window of the dialog D3 according to a use condition. When the user selects [CANCEL], the CPU 10 returns to Step S12 and maintains the locked state (the locked state is maintained).

When the user selects [KNOB], the CPU 10 reflects the current set value of the operation element in the set value of the current memory and proceeds to Step S15 (the value of the operation element). In such a case, the CPU 10 rewrites the set value of the parameter on the current memory with the current set value of the operation element. The digital signal processor 21 performs signal processing with a rewritten set value.

Figure 4C:
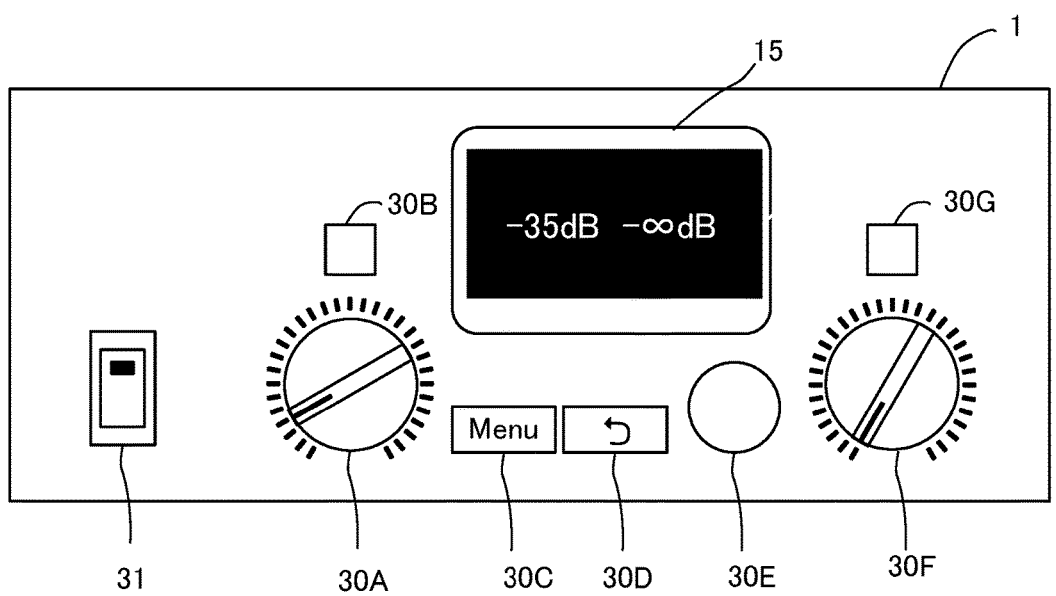
FIG. 4C is a view of the home screen.
Figure 4E:
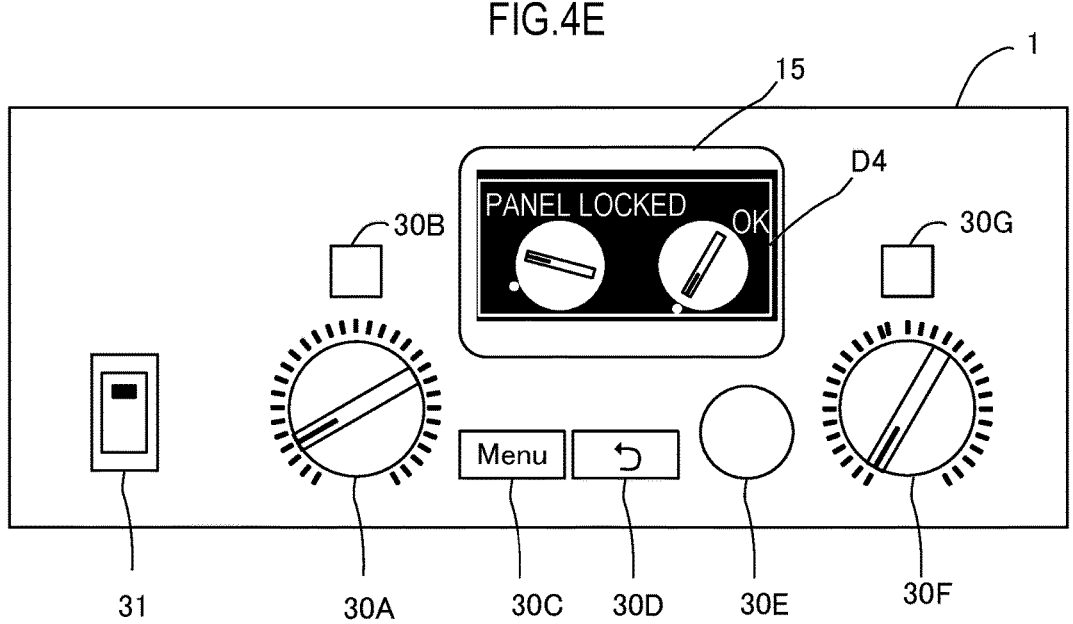
FIG. 4E is a view of a dialog D4.

In Step S15, the CPU 10 releases the locked state of the panel lock, closes the window of the dialog D3 for selecting a release method, and displays the home screen shown in FIG. 4C, on the display device 15. Accordingly, the panel lock processing ends. In such a case, since the lock release has been performed, the user can adjust the level of the volume of the Ach or the Bch by performing the rotation operation of the Ach level knob 30A or the Bch level knob 30F (Step S16).

Further, in Step S14, when the user selects [CUR . . . ], the CPU 10 branches to Step S17 (the current memory value) in order to release the locked state when the set value of the operation element matches the current memory value. In Step S17, the CPU 10 simulates the operation element of the Ach level knob 30A and the Bch level knob 30F shown in FIG. 4E, opens the window of the dialog D4 for displaying a simulated operation element obtained by simulating the position of the operation element, and proceeds to Step S18.

Then, when the user performs the rotation operation of the Ach level knob 30A or the Bch level knob 30F, in Step S18, the CPU 10 rotates and displays the simulated operation element in the dialog D4 according to the contents of the rotation operation of the Ach level knob 30A or the Bch level knob 30F.

Subsequently, in Step S19, the CPU 10 determines whether or not the current set value of the Ach level knob 30A (and the Bch level knob 30F) and the current memory value of the Ach level knob 30A (and the Bch level knob 30F) are equal. The CPU 10 repeats processing of Step S18 and Step S19 until determining that the current set value and the current memory value of the Ach level knob 30A (and the Bch level knob 30F) are equal. The CPU 10, when determining that the current set value and the current memory value of the Ach level knob 30A (and the Bch level knob 30F) are equal, proceeds to Step S20.

In Step S20, the CPU 10 releases the locked state of the panel lock, closes the window of the dialog D4, and displays the home screen shown in FIG. 4G, on the display device 15. Accordingly, the panel lock processing ends. In such a case, since the lock release has been performed, the user can adjust the level of the volume of the Ach or the Bch by performing the rotation operation of the Ach level knob 30A or the Bch level knob 30F.

Subsequently, FIG. 6 is a flow chart of other panel lock processing to be executed by the CPU 10. The CPU 10, in Step S10, displays a setting screen on the display device 15. The CPU 10, in Step S11, shifts to the locked state. The CPU 10, in Step S12, when detecting that the operation element has been operated (Yes), proceeds to Step S30.

In Step S30, the CPU 10 displays a dialog for inputting a password and causes a user to input a password. The CPU 10, when the user inputs a password, determines in Step S31 whether or not an input password has been correctly input. The CPU 10, in a case of determining that a correct password is not input (No), displays a dialog that the password is not correct, and repeats processing of Step S31 until a correct password is input.

The CPU 10, in Step S31, in a case of determining that a correct password has been input (Yes), proceeds to Step S13. Since the processing from Step S13 to Step S20 is as described above, the description is omitted.

The panel lock processing shown in FIG. 6 includes Step S30 and Step S31 that perform password input processing. Therefore, the power amplifier 1 of the present preferred embodiment of the present invention is able to make any persons other than a person in charge unable to perform lock lease, so that the settings are not easily changed due to an operation error and the like, and the security to the settings is enhanced.

Subsequently, FIG. 7 is a flow chart of further other panel lock processing to be executed by the CPU 10. Of the operations shown in FIG. 7, processing of Steps S10, S11, S12, S30, S31, and S13 is as shown in FIG. 6, so that the description is omitted. The CPU 10, in Step S31, in a case of determining that a correct password has been input (Yes), opens the window of the dialog D3 (S13), and proceeds to Step S17.

Since the processing from Step S17 to Step S20 is as described above, the description is omitted. However, in the further other panel lock processing shown in FIG. 7, the processing of Step S14 to Step S16 is omitted. The CPU 10 releases the locked state when a current set value of an operation element and a current memory value match. When the set value of the current memory is updated with the set value of the current operation element, the sound volume level may change abruptly. Therefore, the panel lock processing shown in FIG. 7, the CPU 10 releases the locked state when a current set value of an operation element and a current memory value match. In addition, the panel lock processing shown in FIG. 7 includes Step S30 and Step S31 that perform password input processing. Therefore, the power amplifier 1 of the present preferred embodiment of the present invention is able to make any persons other than a person in charge unable to perform lock lease, so that the settings are not easily changed due to an operation error and the like, and the security to the settings is enhanced.

The above-described preferred embodiments have described the example of a 2ch power amplifier. However, the present invention is also applicable to sound equipment other than the 2ch power amplifier, such as 4ch sound equipment or Bch sound equipment, for example. In addition, the present invention is not limited to a power amplifier. The present invention is also applicable to a method of setting sound equipment other than the power amplifier, such as a speaker processor or a stage box that extends the input/output of a digital mixer, for example. The above-described preferred embodiments have described the lock release method of a panel lock. However, the present invention is not limited to the display of a display device provided in a panel or the lock of an operation element, but is applicable to a method of releasing the display of a display device provided in a place other than a panel or the lock of an operation element.

In addition, in the above-stated preferred embodiments, in a case in which the set value of the operation element of the Ach level knob 30A and the Bch level knob 30F does not match the current memory value (the set value) on the current memory corresponding to the operation element, a dialog that displays a simulated operation element is opened, so that a user can visually grasp a situation that the value of the operation element is deviated from the set value and easily understand such a situation. In such a case, the operation element of which the set value is deviated from the set value of a current memory is operated so as to make the set value that the operation element indicates and the set value of the current value equal, which releases the locked state. Therefore, the user, only by operating an operation element, can release the locked state and can perform lock release quickly and easily. In addition, in the above-stated preferred embodiments, in the locked state, when any one of the plurality of operation elements is operated, a method selection screen for releasing a locked state is displayed. The user, in the method selection screen, can select at least one of the first method of releasing the locked state in a case in which the set value of the current memory and the set value of the operation element are equal and the second method of releasing the locked state by updating the set value of the current memory with the set value of the operation element. Therefore, the user can perform lock release in accordance with a use condition.

Lastly, the foregoing preferred embodiments are illustrative in all points and should not be construed to limit the present invention. The scope of the present invention is defined not by the foregoing preferred embodiment but by the following claims. Further, the scope of the present invention is intended to include all modifications within the scopes of the claims and within the meanings and scopes of equivalents.

What is claimed is:

1. Sound equipment comprising:
an operation element that receives a set value;
a memory that stores the set value;
a processor that performs processing according to the set value stored in the memory;
a controller that executes:
  a normal state in which the set value stored in the memory is updated according to the set value received by the operation element; and
  a locked state in which the set value of the memory is fixed regardless of the set value received by the operation element,
  a release state in which the locked state is released to the normal state according to either:
    a first releasing mode in a case in which the set value of the memory and the set value received by the operation element are equal; or
    a second releasing mode in which the set value stored in the memory is updated with the set value received by the operation element; and
a display that displays a selection screen that receives a selection of the first releasing mode or the second releasing mode.

2. The sound equipment according to claim 1, wherein the controller, in the second releasing mode, gradually brings the set value of the memory, from the set value currently stored in the memory, close to the set value received by the operation element.

3. Sound equipment comprising:
an operation element that receives a set value;
a memory that stores the set value;
a processor that performs processing according to the set value stored in the memory;
a controller that executes a normal state in which the set value stored in the memory is updated according to the set value received by the operation element, and a locked state in which the set value of the memory is fixed regardless of the set value received by the operation element; and
a display that displays a display screen that, when the locked state is released and shifted to the normal state, in a case in which the set value of the memory and the set value received by the operation element have a difference, indicates that the difference is present.

4. The sound equipment according to claim 3, wherein the set value in the locked state is the set value of the operation element when the locked state is set.

5. The sound equipment according to claim 4, wherein the controller, when the display screen is displayed, releases the locked state in a case in which the set value received by the operation element matches the set value of the memory.

6. The sound equipment according to claim 1, wherein:
the operation element is a physical operation element; and
the controller, in a case in which the operation element is operated in the locked state, displays on the display a simulated operation element obtained by simulating an operation state of the operation element.

7. The sound equipment according to claim 1, further comprising a plurality of operation elements.

8. A lock release method comprising:
receiving a set value;
storing the set value in a memory;
performing processing according to the set value stored in the memory;
executing a normal state in which the set value stored in the memory is updated according to the received set value, and a locked state in which the set value of the memory is fixed regardless of the received set value;

displaying a selection screen that receives a selection of either a first releasing mode of releasing the locked state in a case in which the set value of the memory and the received set value are equal or a second releasing mode of releasing the locked state by updating the set value stored in the memory with the received set value; and releasing the locked state by either the first releasing mode or the second releasing mode and shifting the locked state to the normal state.

9. A lock release method comprising:

receiving a set value;

storing the set value in a memory;

performing processing according to the set value stored in the memory;

executing a normal state in which the set value stored in the memory is updated according to a received set value, and a locked state in which the set value of the memory is fixed regardless of the received set value; and displaying a display screen that, when the locked state is released and shifted to the normal state, in a case in which the set value of the memory and the received set value have a difference, indicates that the difference is present.

10. A non-transitory medium storing a program executable by a computer to execute a method comprising:

receiving a set value;

storing the set value in a memory;

performing processing according to the set value stored in the memory;

executing a normal state in which the set value stored in the memory is updated according to a received set value, and a locked state in which the set value of the memory is fixed regardless of the received set value;

displaying a selection screen to receive a selection of either a first releasing mode of releasing the locked state in a case in which the set value of the memory and the received set value are equal or a second releasing mode of releasing the locked state by updating the set value stored in the memory with the received set value; and releasing the locked state by either the first releasing mode or the second releasing mode and shifting the locked state to the normal state.

11. A non-transitory medium storing a program executable by a computer execute a method comprising:

receiving a set value;

storing the set value in a memory;

performing processing according to the set value stored in the memory;

executing a normal state in which the set value stored in the memory is updated according to a received set value, and a locked state in which the set value of the memory is fixed regardless of the received set value; and displaying a display screen that, when the locked state is released and shifted to the normal state, in a case in which the set value of the memory and the received set value have a difference, indicates that the difference is present.

* * * * *